(12) United States Patent
Choi et al.

(10) Patent No.: US 8,840,864 B2
(45) Date of Patent: Sep. 23, 2014

(54) METHOD OF PREPARING ZSM-5 ZEOLITE USING NANOCRYSTALLINE ZSM-5 SEEDS

(75) Inventors: Sun Choi, Daejeon (KR); Deuk Soo Park, Goyang-si (KR); Suk Joon Kim, Daejeon (KR); Dae Hyun Choo, Busan (KR); Yong Ki Park, Daejeon (KR); Chul Wee Lee, Daejeon (KR); Hee Young Kim, Daejeon (KR); Won Choon Choi, Daejeon (KR); Na Young Kang, Chungcheongnam-do (KR); Bu Sub Song, Daejeon (KR)

(73) Assignees: SK Innovation., Ltd., Seoul (KR); Korea Research Institute of Chemical Technology, Daejeon (KR)

( * ) Notice: Subject to any disclaimer, the term of this patent is extended or adjusted under 35 U.S.C. 154(b) by 174 days.

(21) Appl. No.: 13/502,607

(22) PCT Filed: Oct. 18, 2010

(86) PCT No.: PCT/KR2010/007116
§ 371 (c)(1),
(2), (4) Date: May 30, 2012

(87) PCT Pub. No.: WO2011/049333
PCT Pub. Date: Apr. 28, 2011

(65) Prior Publication Data
US 2012/0230910 A1    Sep. 13, 2012

(30) Foreign Application Priority Data

Oct. 20, 2009    (KR) .................. 10-2009-0099550

(51) Int. Cl.
*C01B 39/38*    (2006.01)
*B01J 29/40*    (2006.01)
(52) U.S. Cl.
CPC . *C01B 39/38* (2013.01); *B01J 29/40* (2013.01)
USPC ....................................................... 423/709

(58) Field of Classification Search
CPC ................................. C01B 39/38; B01J 29/40
USPC ........................................................... 423/709
See application file for complete search history.

(56) References Cited

U.S. PATENT DOCUMENTS

| 4,257,885 A | 3/1981 | Grose et al. |
|---|---|---|
| 4,585,638 A | 4/1986 | Kuhl |

(Continued)

FOREIGN PATENT DOCUMENTS

| DE | 207185 A1 | 2/1984 |
|---|---|---|
| DE | 207186 A1 | 2/1984 |

(Continued)

OTHER PUBLICATIONS

Majano et al, "Seed-Induced Crystallization of Nanosized NA-ZSM-5 Crystals", Ind. Eng. Chem. Res. (Jun. 2009), pp. 7084-7091.*
V.P. Shiralkar et al.; "Synthesis of ZSM-5 with variable crystallite size and its influence on physicochemical properties"; Zeolites; vol. 11, (1991) 511-516.
Shin Dong Kim et al.; "Compositional and kinetic study on the rapid crystallization of ZSM-5 in the absence of organic template under stirring"; Microporous and Mesoporous Materials 72 (2004); 185-192.

(Continued)

*Primary Examiner* — David M Brunsman
(74) *Attorney, Agent, or Firm* — Abelman, Frayne & Schwab

(57) ABSTRACT

A method of preparing ZSM-5, including: providing a nanocrystalline ZSM-5 seed having a size of 70-150 nm; adding the nanocrystalline ZSM-5 seed to a stock solution including water glass as a silica source, an alumina source, a neutralizer and water to form a reaction mixture; and maintaining the reaction mixture at 150-200° C. to crystallize the reaction mixture. The method is advantageous in that ZSM-5 having small and uniform crystal sizes and including no impurities can be synthesized in a short period of time.

5 Claims, 11 Drawing Sheets

(56) References Cited

U.S. PATENT DOCUMENTS

| | | | |
|---|---|---|---|
| 4,650,655 | A | 3/1987 | Chu et al. |
| 4,778,666 | A | 10/1988 | Chu et al. |
| 5,174,981 | A | 12/1992 | Hellring et al. |
| 5,268,162 | A | 12/1993 | Ishida et al. |
| 2003/0003035 | A1 | 1/2003 | Stamires et al. |

FOREIGN PATENT DOCUMENTS

| | | |
|---|---|---|
| KR | 19960002621 B1 | 2/1996 |
| KR | 1020070020354 A | 2/2007 |

OTHER PUBLICATIONS

Yuanyuan Hu; "Microwave-assisted hydrothermal synthesis of nanozeolites with controllable size"; Microporous and Mesoporous Materials 119 (2009) 306-314.

International Search Report for PCT/KR2010/007116 dated Jun. 22, 2011.

Gerardo Majano et al.; "Seed-Induced Crystallization of Nanosized Na-ZSM-5 Crystals"; Industrial & Engineering Chemistry Research; vol. 48, No. 15, Aug. 5, 2009.

Supplementary European Search Report for Application No. 10825158.8 (PCT/KR2010007116) dated May 29, 2013.

* cited by examiner

METHOD OF PREPARING ZSM-5 ZEOLITE USING NANOCRYSTALLINE ZSM-5 SEEDS

This application is a National Phase of PCT/KR2010/007116, filed 18 Oct. 2010, which claims priority from Korean Application No. 10-2009-0099550, filed 20 Oct., 2009, both of which are incorporated herein by reference.

TECHNICAL FIELD

The present invention relates to a method of preparing ZSM-5 zeolite using nanocrystalline ZSM-5 seeds having a size of 70~300 nm.

BACKGROUND ART

Generally, zeolite is widely used as a catalyst, an adsorbent, a molecular sieve, an ion exchanger or the like because it has a peculiar three-dimensional crystal structure of aluminosilicate, and has large pore and excellent ion-exchange performance compared to other aluminosilicate crystals. The use of natural zeolite is limited because of its structural restrictions, but the use of synthetic zeolite is gradually enlarged. In order to expand the use of zeolite, it is required to arbitrarily control the crystal size, particle size distribution and form of zeolite as well as to efficiently synthesize zeolite.

ZSM-5 zeolite forms three-dimensional pores defined by 10 tetrahedron rings, and its size is equal to that of zeolite A or is in the middle between zeolite X and zeolite Y. Further, ZSM-5 zeolite is a kind of pentasil zeolite which is a shape-selective catalyst exhibiting peculiar adsorption and diffusion characteristics, and generally has high thermal stability and has hydrophobicity because it has high ratio of $SiO_2/Al_2O_3$. Further, ZSM-5 zeolite has strong Lewis acid sites, but has weak Bronsted acid sites. In particular, ZSM-5 zeolite is used to directly obtain gasoline fraction having a high octane number from methanol by an MTG process, and is known to have excellent selectivity of gasoline fraction.

After ZSM-5 having a high content of silica was first developed by Mobil Corporation in the early 1970's, research into this material has been variously made due to peculiar catalytic activity and shape selectivity resulting from the molecular sieve effect of this material. Unlike aluminosilicate zeolite, various kinds of organic materials have been used as structure inducing substances for forming a structure to prepare ZSM-5.

To date, among the organic materials known to be effective in forming the structure of ZSM-5, tetrapropylammonium cations have been known to have the most excellent structure inducing effect. Currently, most of commercially-available ZSM-5 is being synthesized using this material. However, although organic structure inducing materials including tetrapropylammonium ions exhibit excellent structure inducing effects, attempts not to use them have been made because they are disadvantageous in the economical and environmental aspects, and several processes for this purpose have been developed (U.S. Pat. No. 4,257,885). The reason for not using organic structure inducing materials is that they are expensive and that they cause environmental pollution because they have strong toxicity. When ZSM-5 is synthesized using an organic structure inducing material, a secondary cost is required to treat a toxic unreacted organic structure inducing material included in waste water.

Further, the structure inducing material included in the crystalline particles of the synthesized ZSM-5 must be pyrolyzed and then removed by a calcination process at 550° C. or more. In this case, when the structure inducing material is not completely pyrolyzed during the calcination process, pores are blocked, thus severely deteriorating catalytic activity. Further, an additional cost is required due to the calcination process, and atmospheric pollution cannot be avoided due to exhaust gas generated by the pyrolysis of organic materials.

Therefore, in order to overcome the above problems, Flanigen et al. (U.S. Pat. No. 4,257,885) first reported a method of synthesizing ZSM-5 using crystalline seeds under the condition of excluding an organic structure inducing material or without using crystalline seeds. However, this synthesis method is problematic in that it needs a long reaction time of 68~120 hours. Further, when ZSM-5 is synthesized under the condition of excluding the organic structure inducing material, this method is sensitively influenced by reaction conditions, thus requiring careful attentions.

The factors influencing the synthesis of ZSM-5 may include the type of a silica source, the ratio of Si/Al, the concentration of and alkali solution, the mixing sequence of reactants, crystallization temperature, crystallization time, the degree of aged, stirred or not, and the like. Among these factors, the type of a silica source is known as the most important factor.

Water glass, silica sol or the like is used as the silica source. Water glass, which is prepared by melting solid silicate with water, is the cheapest silica source. However, it is difficult to control the composition of reactants because water glass includes a large amount of alkali components. Therefore, the concentration of alkali components in the water glass can be controlled by the addition of sulfuric acid or aluminum sulfate. However, this synthesis method is problematic in that ZSM-5 is nonuniformly crystallized because reaction conditions are complicated, and in that the cost for post-treatment such as salt removal is increased (related German Patent No. 207185).

Silica sol, which is another silica source, has good reactivity and is easily treated. However, silica sol is more expensive than other silica sources, and its silica components are dispersed in a large amount of water in a colloidal state and react with aluminum components to form hydrogel, so that the two components must be brought into contact with each other in a diluted state in order to prevent the formation of hydrogel. In this case, there are problems in that the solid content of the synthesized ZSM-5 is low based on the particles crystallized during the process of synthesizing ZSM-5, and the crystalline particles of ZSM-5 are finely dispersed in a state of separate particles, so that a high load occurs during a remainder separation process and a water washing process, and in that unreacted components are discharged from the remainder and the water washing solution, with the result that the productivity of ZSM-5 becomes low, so that this synthesis method is not suitable for industrial production methods (related German Patent No. 207186).

In addition, Korean Unexamined Patent Application Publication No. 10-2007-0020354 discloses a method of preparing a ZSM-5 molecular sieve catalyst having a small crystal size using diatomite or silica aerogel as a main silica source by adding a seed crystal orienting agent, silica sol and sodium silicate to conduct kneading and molding and then performing a gas-solid phase crystallization of the silica source using organic amine and steam to convert the crystallized silica source to ZSM-5 having a small crystal size. However, this method is also problematic in that process costs are increased because nanosized seeds and organic amine are used in order to obtain fine ZSM-5.

Further, Korean Patent registration No. 1996-0002621, filed by Mobil Corporation, discloses a method of preparing small-crystal-sized ZSM-5 having high mesitylene absorbing ability without adding any organic material. In this method, ZSM-5 is prepared by using a reaction mixture including an alumina source, acid and ZSM-5 seeds in addition to sodium silicate used as a silica source under the condition that an organic structure inducing material does not exist. This method is characterized in that the crystal size of ZSM-5 is controlled using the solid content of the reaction mixture and the molar ratio of OH—/SiO2, but is problematic in that the degree of crystallization of ZSM-5 does not reach 50~75%.

Meanwhile, recently, as a method for shortening hydrothermal synthesis time, a microwave synthesis method is introduced. In the microwave synthesis method, the time taken to form seeds and crystallize a sample can be shortened by directly supplying microwave energy to the sample not by supplying energy from an external heat source to the sample using thermal conduction. That is, ions are rapidly vibrated and water dipoles are rapidly rotated by microwaves, so that temperature is rapidly raised by the friction between molecules in a solution, thereby rapidly crystallizing the sample.

Mobil Corporation of U.S.A. first introduced a method of preparing a porous molecular sieve material using microwave energy (U.S. Pat. No. 4,778,666). In this method, the microwave energy used to synthesize the zeolite had a frequency range of 915~2450 MHz, and ZSM-5 zeolite was synthesized using crystal seeds in a container (glass, ceramic, PTF). Recently, methods of synthesizing nanosized silicalite-1, ZSM-5, LTL, LTA and the like by dividing reactions into two steps of a seed formation reaction and a crystallization reaction and then applying microwaves thereto have been reported by Nan Ren and Yi Tang et al. (Microporous and Mesoporous Materials, 3, 306 (2009)).

As described above, the above-mentioned ZSM-5 synthesis methods are problematic in that, when ZSM-5 is synthesized using cheap water glass as a silica source without an organic structure inducing material, the composition range of synthesizable reactants is narrow, and synthesis time is long. Further, the above-mentioned ZSM-5 synthesis methods are problematic in that the distribution of particle sizes is wide, and the degree of crystallinity of synthesized zeolite is low.

DISCLOSURE OF INVENTION

Technical Problem

Thus, the present inventors have made wide researches into solving the above problems. As a result, they found that, in the synthesis of ZSM-5 using water glass as a silica source under the condition of excluding an organic structure inducing material, when nanocrystalline ZSM-5 seeds are introduced, ZSM-5 having a relative crystallinity of 100% or more, which has small-size crystals, is uniform and does not include impurities, can be prepared. Based on this finding, the present invention was completed.

The present invention intends to provide a method of preparing fine and uniform ZSM-5 having a relative crystallinity of 100% or more by adding nanocrystalline ZSM-5 seeds having a particle size of 70~300 nm to the composition containing no organic structure-inducing material.

Solution to Problem

An aspect of the present invention provides a method of preparing ZSM-5, including: providing a nanocrystalline ZSM-5 seed having a size of 70~300 nm; adding the nanocrystalline ZSM-5 seed to a stock solution including water glass as a silica source, an alumina source, a neutralizer and water to form a reaction mixture; and maintaining the reaction mixture at 150~200° C. to crystallize the reaction mixture.

Here, the stock solution may have a composition represented by $[Na_2O]_X[Al_2O_3]_Y[SiO_2]_{100}[H_2O]_Z$ in which X is 10~26, Y is 0.2~5, and Z is 2500~4000.

Further, the amount of the nanocrystalline ZSM-5 seed added to the stock solution may be 0.1~6 wt % based on the reaction mixture.

Further, the alumina source may be one or more selected from sodium aluminate, aluminum nitrate, aluminum chloride, aluminum acetate, aluminum sulfate, aluminum isopropoxide, and aluminum acetylacetonate.

Further, the neutralizer may be any one selected from hydrochloric acid, nitric acid, phosphoric acid, sulfuric acid, and aluminum sulfate.

Further, the crystallizing of the reaction mixture may be performed for 12~72 hours.

Advantageous Effects of Invention

As described above, according to the present invention, ZSM-5 having small and uniform crystal size and including no impurities can be prepared in a short period of time by introducing nanocrystalline ZSM-5 seeds. Further, the crystal size of ZSM-5 can be adjusted by adjusting the size of the nanocrystalline ZSM-5 seed. Further, environment-friendly ZSM-5 can be prepared because an organic structure-inducing material is not used. Further, high-quality ZSM-5 can be more easily synthesized from a wide composition range of water glass.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Figure 1:
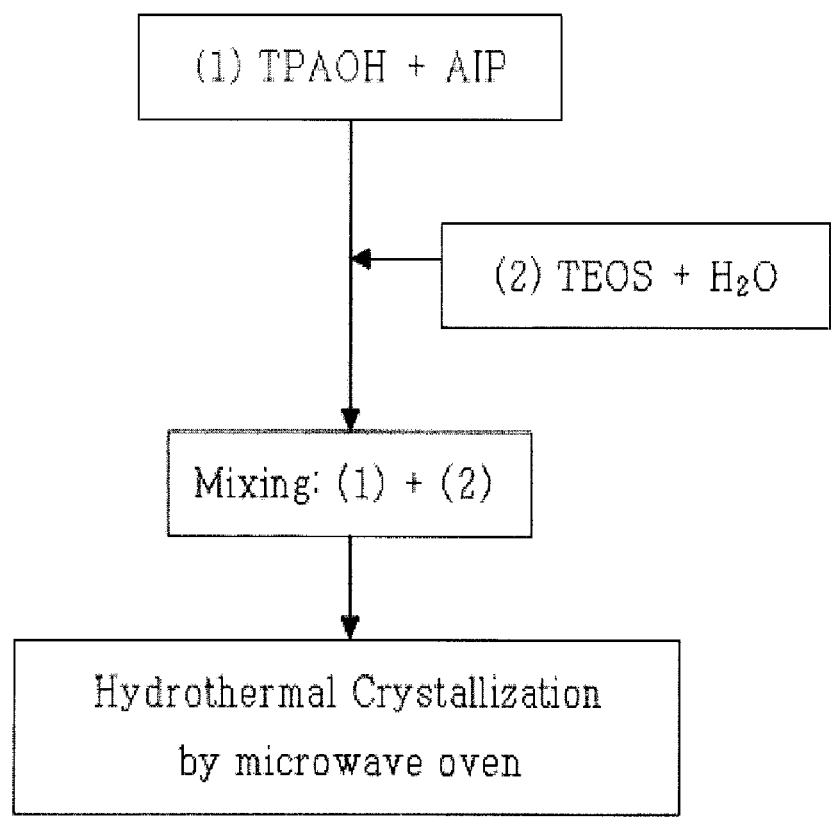
FIG. 1 is a flowchart showing a process of synthesizing nanocrystalline ZSM-5 seeds according to the present invention.

Hereinafter, the present invention will be described in detail.

As described above, the present invention provides a method of preparing ZSM-5, including: providing a nanocrystalline ZSM-5 seed having a size of 70~300 nm; adding the nanocrystalline ZSM-5 seed to a stock solution including water glass as a silica source, an alumina source, a neutralizer and water to form a reaction mixture; and maintaining the reaction mixture at 150~200° C. to crystallize the reaction mixture.

In the present invention, first, a nanocrystalline ZSM-5 seed is provided. The nanocrystalline ZSM-5 seed serves to increase crystallization speed, and has a size of 70~300 nm, preferably, 70~150 nm. Further, the nanocrystalline ZSM-5 seed may have a relative crystallinity of 100% or more, which does not include impurities.

Here, the term "relative crystallinity" used in the present specification is represented by the following Equation (in the present specification, ACZeo-ZN030 (SiO2/Al2O3 Mole ratio=30), manufactured by Albemarle Corporation, was used as an example of commercially available ZSM-5):

$$\text{Relative crystallinity}(\%) = \frac{\left(\begin{array}{c}\text{peak area of } 22-25 \ o \text{ obtained after } XRD \\ \text{analysis of synthesized product}\end{array}\right) \times 100}{\text{peak area of } 22-25 \ o \text{ obtained after } XRD \text{ analysis of commercially available } ZSM-5}$$

Meanwhile, the nanocrystalline ZSM-5 seed can be synthesized using any one of commonly known synthesis methods (for example, a synthesis method proposed by Nan Ren and Yi Tang (Microporous and Mesoporous Materials, 3, 306, (2009))) as long as it has a constant nanosize and does not include impurities. Therefore, in the process of synthesizing the nanocrystalline ZSM-5 seed, whether or not an organic structure-inducing material is used, the kind of silica source or aluminum source, the type of crystallization method (for example, hydrothermal synthesis or microwave synthesis) do not act as factors restricting the scope of the nanocrystalline ZSM-5 seed of the present invention.

Further, the stock solution used to prepare the nanocrystalline ZSM-5 seed has a composition represented by [TPA+]25[SiO2]100[Al2O3]$_X$[H2O]1600 (here, X is 0.5~10).

The silica source constituting the stock solution may be selected from tetraethyl orthosilicate (TEOS), diatomite, sodium silicate, colloidal silica, and solid powdered silica (fumed silica). Preferably, the silica source may be tetraethyl orthosilicate (TEOS). Further, the alumina source may be selected from sodium isopropoxide, sodium aluminate, and aluminum oxide. Preferably, the alumina source is sodium iso-propoxide. If an organic structure inducing material is used, as the organic structure inducing material, various kinds of amines, such as propylamine, dipropylamine, tripropylamine, ethylenediamine, diaminopropane, diaminobutane, diaminopentane, di-aminoheptane, tetrapropylammonium hydroxide (TPAOH), tetrapropyl ammonium bromide (TPABr) and the like may be used. Preferably, the organic structure inducing material may be tetrapropylammonium hydroxide (TPAOH) or tetrapropyl ammonium bromide (TPABr).

The composition is stirred and aged at room temperature, and the aged composition may be crystallized using a commonly known method, for example, hydrothermal synthesis or microwave synthesis. When the aged composition is crystallized by microwave synthesis, primarily, the aged composition is irradiated with microwaves at a temperature of 60~100° C. for 60~120 minutes, and, secondarily, irradiated with microwaves at a temperature of 110~170° C. for 30~240 minutes.

The nanocrystalline ZSM-5 seed obtained in this way has a relative crystallinity of 100% or more, which is evaluated by X-ray diffraction (XRD) analysis, and has a particle size of 70~300 nm.

The synthesized nanocrystalline ZSM-5 seed can be used to increase crystallization speed and crystallinity and to adjust the crystal size during the preparation of ZSM-5 of the present invention. Further, the amount of the nanocrystalline ZSM-5 seed used may be adjusted depending on the crystal size of the final ZSM-5. Generally, the crystal size of ZSM-5 decreases when the amount of the nanocrystalline ZSM-5 seed increases. Therefore, in order to obtain fine and uniform ZSM-5, the nanocrystalline ZSM-5 seed is added to the stock solution in an amount of 0.1~6 wt %, preferably, 0.1~4 wt % based on the reaction mixture.

In order to prepare the ZSM-5 of the present invention, the synthesized crystalline ZSM-5 seed, a silica source, an alumina source, a neutralizer and water are used without using an organic structure-inducing material. As the silica source, silica sol, water glass or sodium silicate may be used, but, in the present invention, it is preferable that water glass be used.

When the organic structure-inducing material is not used, alumina is a very important material in the preparation of ZSM-5. The alumina source is selected from sodium aluminate, aluminum nitrate, aluminum sulfate, aluminum chloride, aluminum acetate, aluminum isopropoxide, aluminum acetylacetonate, and mixtures thereof. Preferably, the alumina source is selected from sodium aluminate, aluminum nitrate, aluminum sulfate, and mixtures thereof.

As is well known, the water used in the reaction mixture of the present invention is a material essential for hydrothermal synthesis, and may be distilled water. The amount of water in the reaction mixture greatly influences the crystallization reaction. In the present invention, the amount of water in the reaction mixture is adjusted such that the molar ratio of H20/SiO2 is 25~40, preferably, 25~30. When the amount of water in the reaction mixture is excessively high, crystallization speed is decreased, so that crystallization reaction time is excessively increased and the yield of ZSM-5 is decreased. Therefore, the amount of water in the reaction mixture is required to be properly adjusted.

Further, the neutralizer used in the present invention is a material added to overcome the difficulty of controlling the composition of reactants. This difficulty is attributable to the fact that the silica source and the alumina source include a large amount of alkali components. The neutralizer may be hydrochloric acid, nitric acid, phosphoric acid, sulfuric acid or aluminum sulfate, and, preferably, sulfuric acid.

According to a preferred embodiment of the present invention, the stock solution including water glass as a silica source, an alumina source, a neutralizer and water has a composition represented by [Na2O]X[Al2O3]Y[SiO2]100[H2O]Z in which X is 10~26, Y is 0.2~5, and Z is 2500~4000. The temperature condition in the preparation of the stock solution is not particularly limited, but the stock solution is generally prepared at room temperature.

The stock solution may be prepared in one step or a plurality of steps. If the stock solution is prepared is one step, the order of mixing the raw material components is not particularly limited. Therefore, the raw material components may be mixed in the order of water glass as a silica source, water, a neutralizer and an alumina source or in the order of an alumina source, water, a neutralizer and water glass as a silica source.

However, in the stock solution, whether the water glass as a silica source or the alumina source is present in a state of a uniform aqueous gel solution greatly influences the synthesis of uniform and fine ZSM-5. Therefore, it is preferred that the stock solution be prepared in a plurality of steps rather than a single one.

Accordingly, the reaction mixture of the present invention is prepared as follows. First, a silica source and water are mixed and then stirred for 20~40 minutes to form a first aqueous solution. Meanwhile, an alumina source, a neutralizer and water are mixed and then stirred for 15~30 minutes, and then the synthesized nanocrystalline ZSM-5 seed is added thereto to form a second aqueous solution. Subsequently, the first aqueous solution and the second aqueous solution are mixed with each other to prepare the reaction mixture. In this case, when the molar ratio of H2O/SiO2 in the reaction mixture is below 25, water may further be added as a balancing component selectively.

According to a preferred embodiment of the present invention, the hydrothermal crystallization of the reaction mixture may be performed at a temperature of 150~200° C. for 12~48 hours, preferably, 18~30 hours. Therefore, in the present invention, the time taken to synthesize ZSM-5 can be greatly decreased compared to conventional technologies.

In the preparation of ZSM-5, when hydrothermal synthesis is performed using only the reaction mixture without adding the nanocrystalline ZSM-5 seed, mordenite as well as ZSM-5 are simultaneously obtained.

However, when hydrothermal synthesis is performed using the reaction mixture including the nanocrystalline ZSM-5 seed, only pure ZSM-5 having a uniform particle size is obtained. Further, due to the addition of the nanocrystalline ZSM-5 seed, ZSM-5 having high crystallinity can be obtained even without adding sulfuric acid, and the obtained ZSM-5 crystal is fine and uniform.

Figure 2:
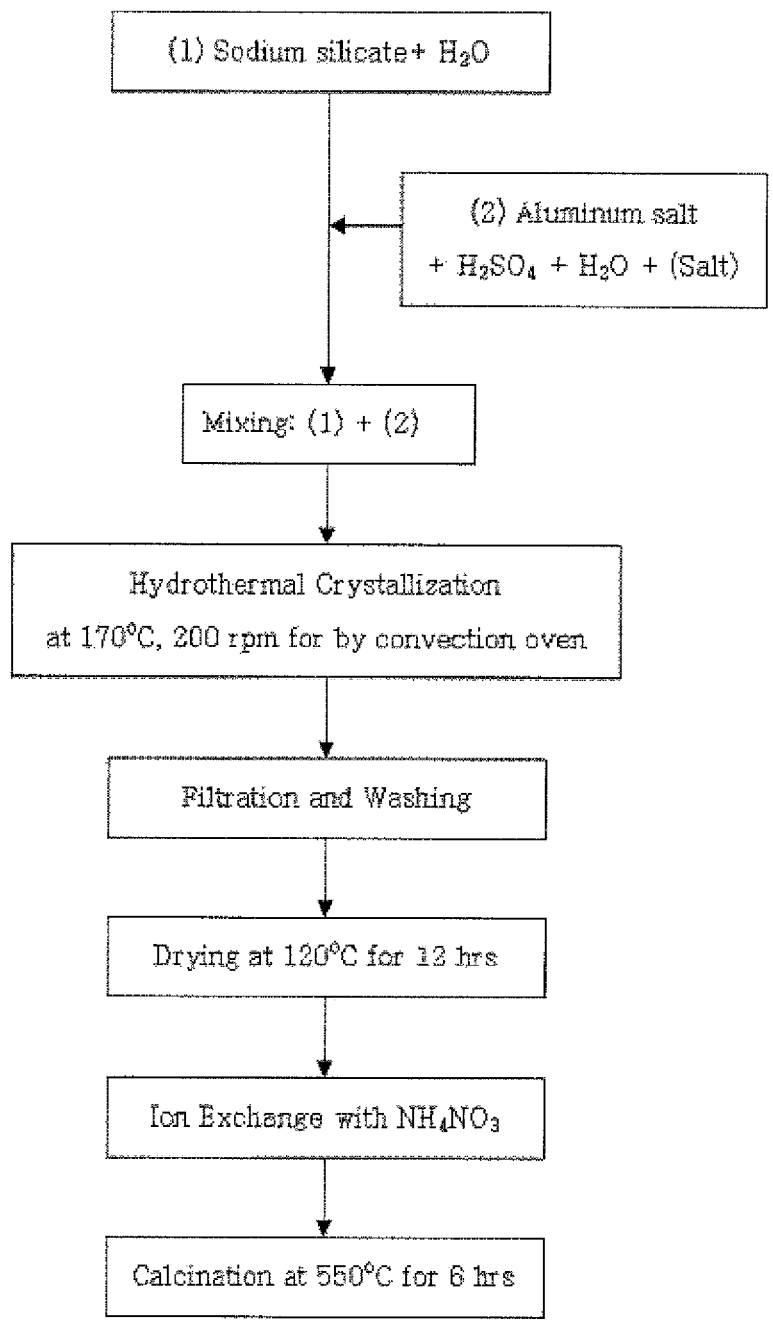
FIG. 2 is a flowchart showing a process of synthesizing ZSM-5 according to the present invention.

The post-treatment of the obtained ZSM-5 including no impurities is performed as shown in FIG. 2. That is, the crystallized ZSM-5 is filtered and washed, and then dried at a temperature of 100~120° C. for 10~15 hours. Subsequently, the dried ZSM-5 is ion-exchanged with NH4NO3, and then calcinated at a temperature of 500~600° C. for 5~8 hours to obtain a final product.

The ZSM-5 synthesized according to the present invention has a narrow particle size distribution such that its average particle size is controlled within the range of 0.2 to 2.0 μm.

Meanwhile, the phase and relative crystallinity of the product obtained by the above method can be calculated by collecting the data of 2θ 7~9° and 22~25° corresponding to the characteristic peaks of ZSM-5 using an X-ray diffraction (XRD) analyzer (for example, Rigaku Model D/Max III).

The form of the product can be observed by a scanning electron microscope (SEM) (for example, Akasi Alpha 25A), and the crystal size distribution thereof can be measured by a particle size distribution (PSD) analyzer (for example, ELS-Z2, Otsuka).

MODE FOR THE INVENTION

Hereinafter, the present invention will be described in more detail with reference to the following Examples. However, these Examples are set forth to illustrate the present invention, and the scope of the present invention is not limited thereto.

EXAMPLES

Preparation Examples 1 and 2

Synthesis of Nanocrystalline ZSM-5 Seed 13.6 g (Preparation Example 1) or 36.1 g (Preparation Example 2) of TPAOH serving as an organic structure-inducing material was mixed with 0.1 g (Preparation Example 1) or 0.4 g (Preparation Example 2) of aluminum isopropoxide serving as an alumina source, and then the mixture was uniformly stirred for 30 minutes. Subsequently, 13.6 g (Preparation Example 1) or 36.0 g (Preparation Example 2) of TEOS and 72.7 g (Preparation Example 1) or 27.5 g (Preparation Example 2) of distilled water were added to the stirred mixture, and then stirred for 2 hours to form a reaction mixture.

Figure 3:
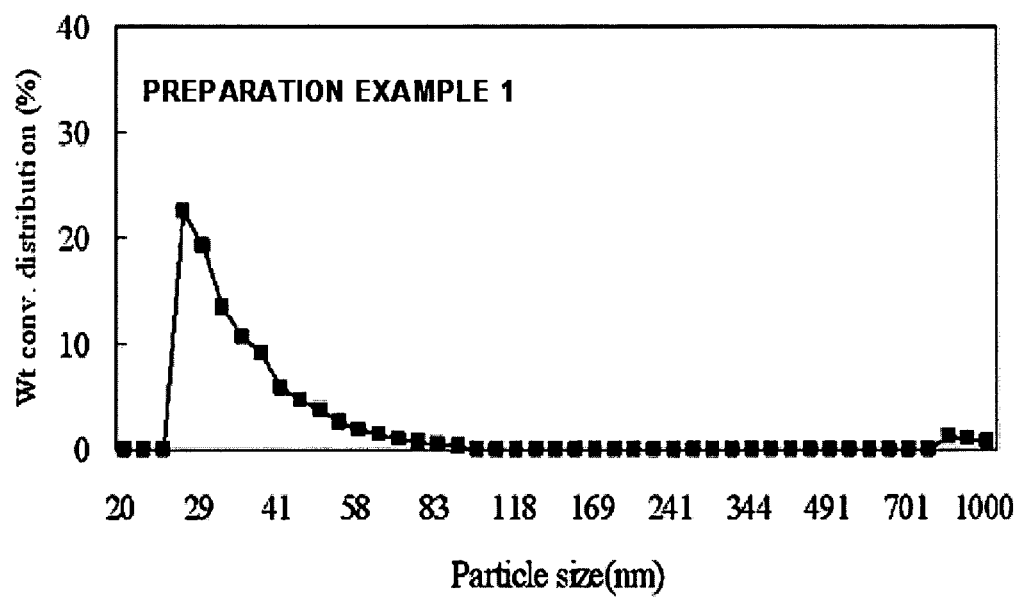
FIG. 3 shows a graph and a photograph of X-ray diffraction (XRD) analysis and scanning electron microscope (SEM) analysis of ZSM-5 seeds synthesized in Preparation Examples 1 and 2, respectively.
Figure 3:
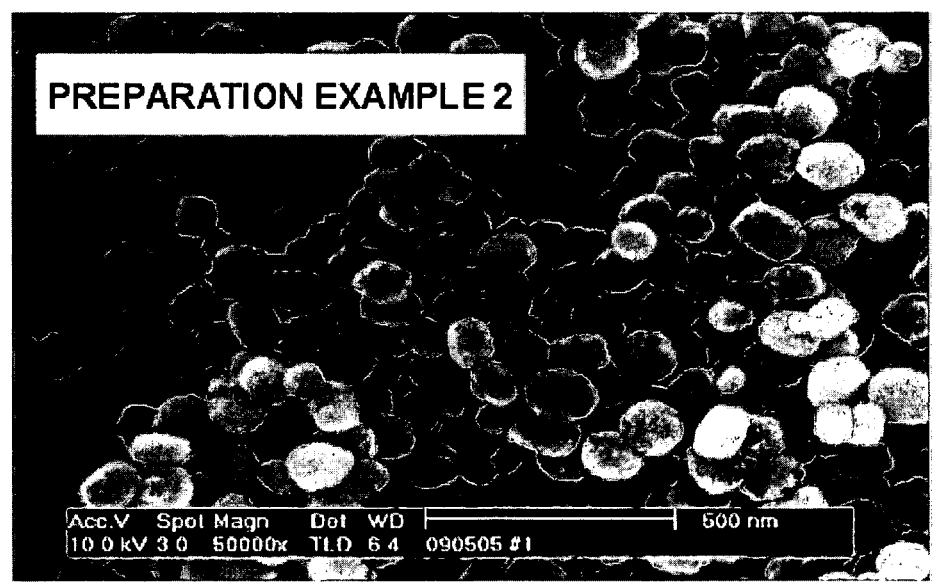

Subsequently, the reaction mixture was put into a microwave synthesis reactor (manufactured by CEM Corp.), and was then irradiated with microwaves at 80° C. for 90 minutes in the first step and then irradiated with microwaves at 130° C. for 180 minutes in the second step to synthesize a nanocrystalline ZSM-5 seed. Thereafter, the XRD analysis and SEM analysis of the samples obtained by centrifugally-separating the stock solution including the synthesized nanocrystalline ZSM-5 seed were conducted. The results thereof are shown in Table 1 and FIG. 3.

TABLE 1

| | Amount of raw material used (wt %) | | | | Phase after crystallization | Average crystal size (nm) |
|---|---|---|---|---|---|---|
| | TEOS | TPAOH | AIP | distilled water | | |
| Prep. Exp. 1 | 13.6 | 13.6 | 0.1 | 72.7 | ZSM-5 | 20~60 |
| Prep. Exp. 2 | 36.1 | 36.0 | 0.4 | 27.5 | ZSM-5 | 70~150 |

Comparative Examples 1 to 3

Figure 4A:
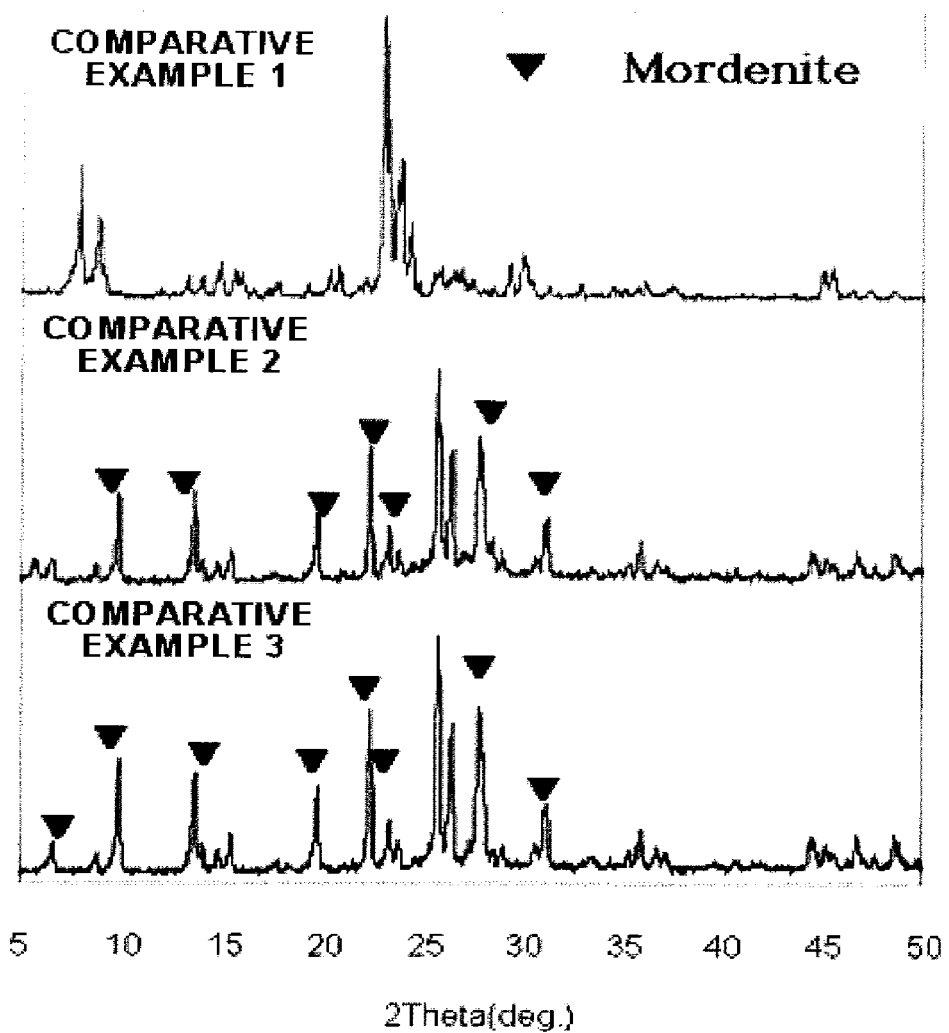
FIGS. 4A and 4B show a graph and a photograph of X-ray diffraction (XRD) analysis and scanning electron microscope (SEM) analysis of ZSM-5 seeds synthesized in Comparative Examples 1 to 3, respectively.
Figure 4B:
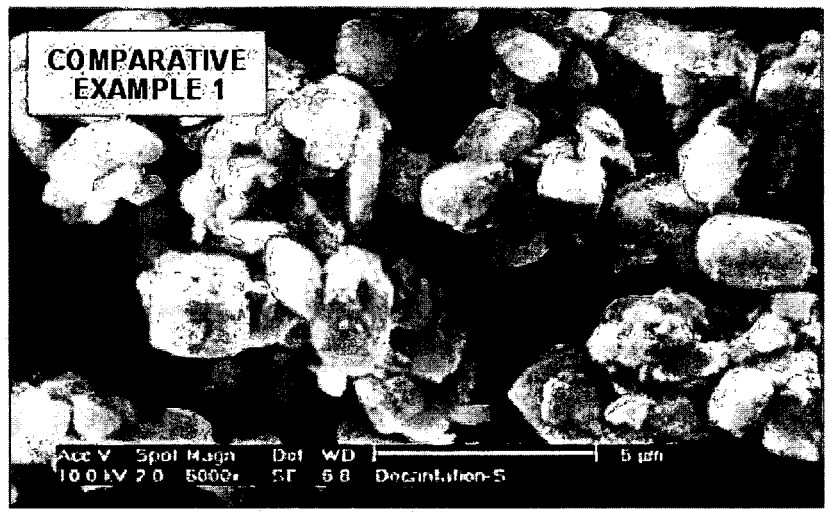
Figure 4B:
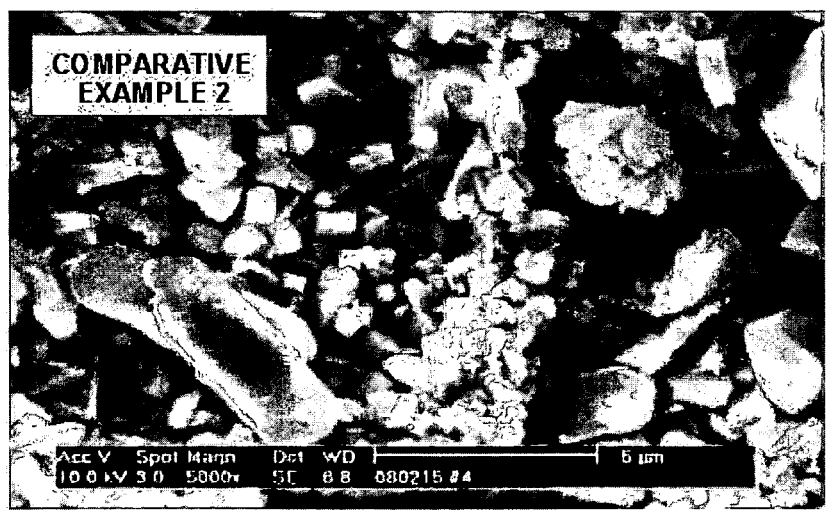
Figure 4B:
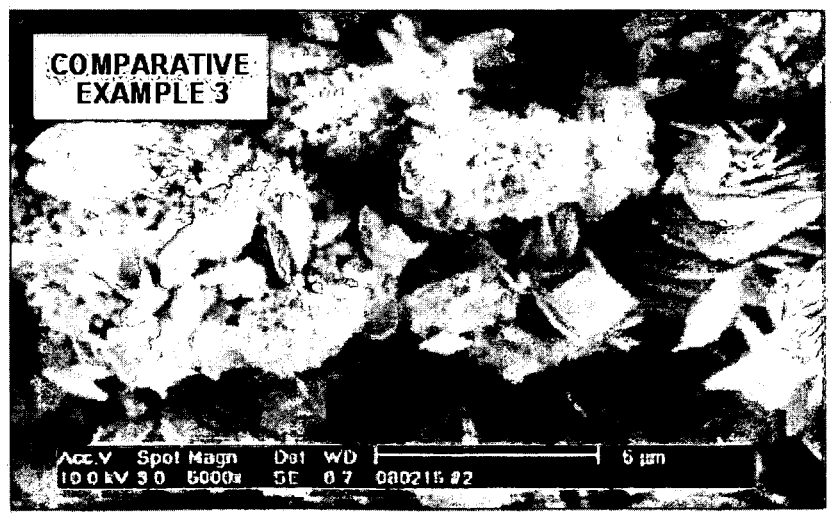

Synthesis of ZSM-5 Without Using Nanocrystalline ZSM-5 Seed 26.1 g of water glass serving as a silica source was mixed with 33.4 g of distilled water, and was then stirred for 30 minutes to provide solution 1. Further, 3.1 g of aluminum salt, 4.0 g (Comparative Example 1), 3.2 g (Comparative Example 2) or 2.2 g (Comparative Example 3) of sulfuric acid, and 33.3 g of distilled water were mixed and then stirred for 30 minutes to provide solution 2. Subsequently, solution 1 and solution 2 were mixed with each other, stirred, put into a teflon vessel, hydrothermally synthesized at 170° C. for 24 hours and then cooled at room temperature to obtain a synthesized stock solution. Subsequently, the synthesized stock solution was dried at 120° C. for 12 hours, and then the X-ray diffraction (XRD) analysis and scanning electron microscope (SEM) analysis of the dried synthesized stock solution were conducted. The results thereof are shown in Table 1, FIG. 2 and FIGS. 4A and 4B.

Comparative Examples 4 to 7

Synthesis of ZSM-5 Using Nanocrystalline ZSM-5 Seed of Preparation Example 1

Figure 5A:
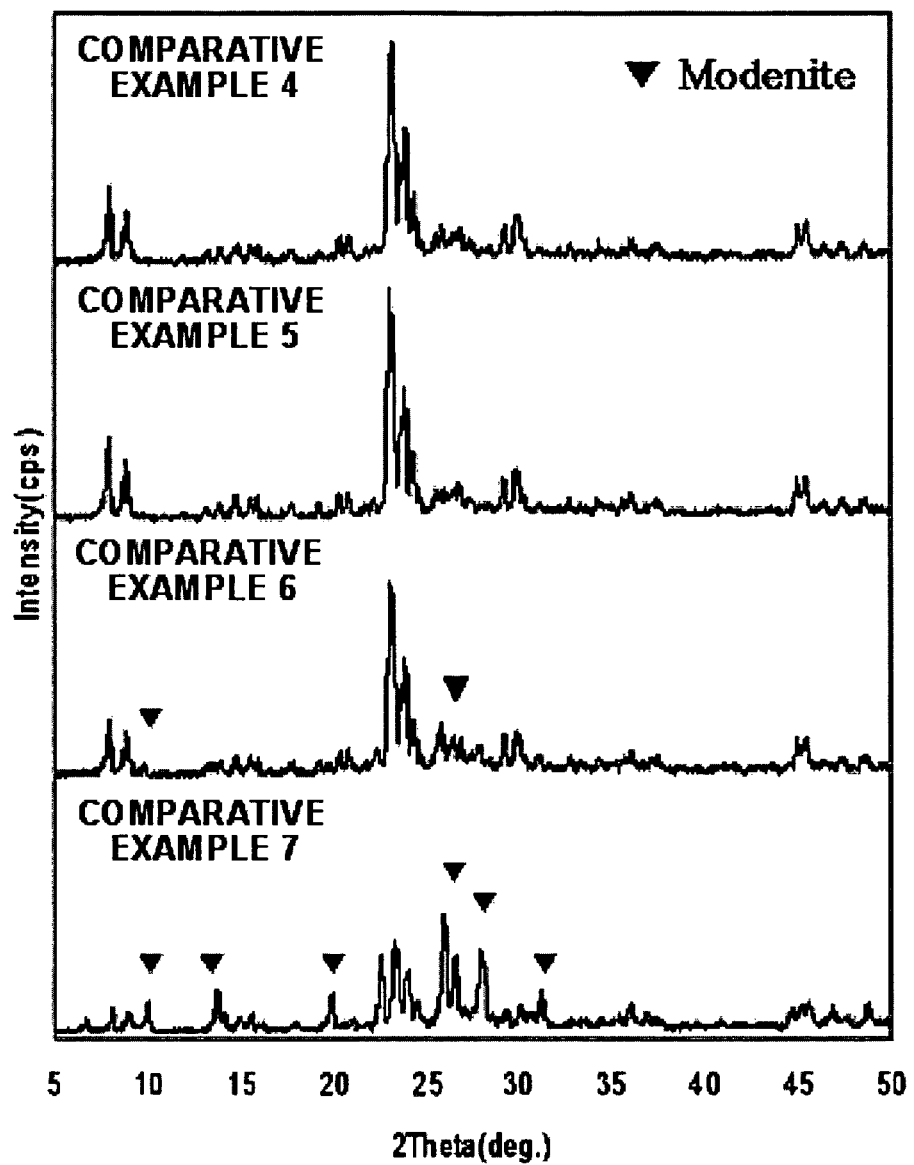
FIGS. 5A and 5B show a graph and a photograph of X-ray diffraction (XRD) analysis and scanning electron microscope (SEM) analysis of ZSM-5 seeds synthesized in Comparative Examples 4 to 7, respectively.
Figure 5B:
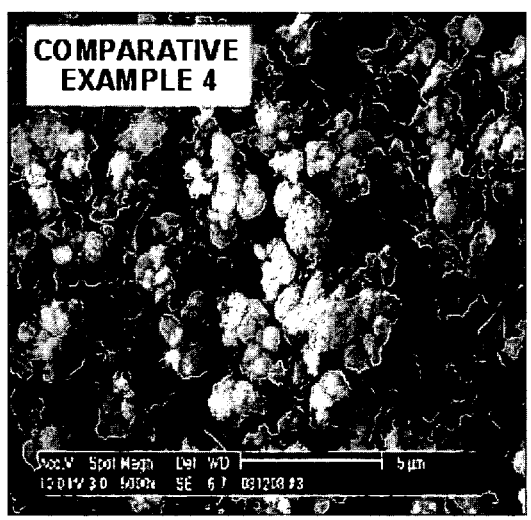
Figure 5B:
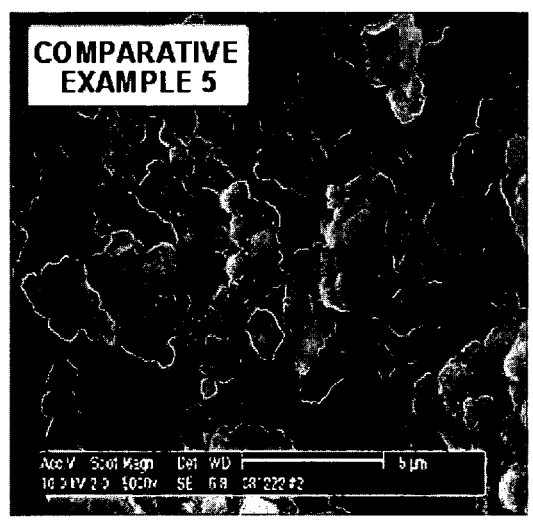
Figure 5B:
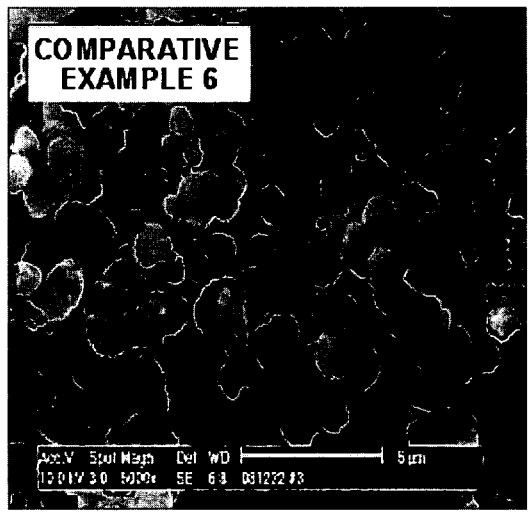
Figure 5B:
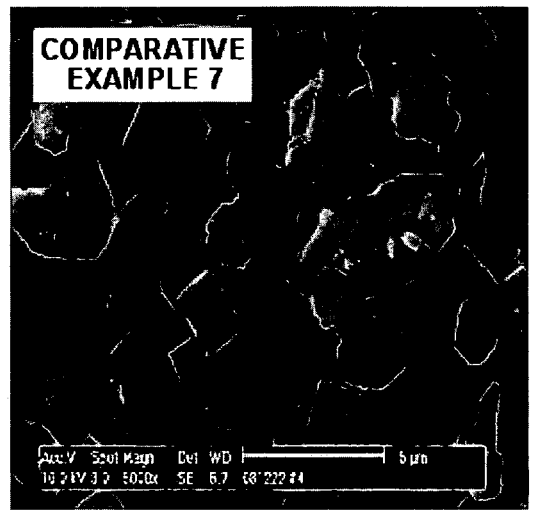

25.8 g of water glass serving as a silica source was mixed with 33.2 g of distilled water, and was then stirred for 30 minutes to provide a solution 1. Further, 3.1 g of aluminum sulfate, 4.0 g (Comparative Example 4), 3.0 g (Comparative Example 5), 2.0 g (Comparative Example 6) or 1.1 g (Comparative Example 7) of sulfuric acid, and 33.2 g of distilled water were mixed and then stirred for 20 minutes, and then 0.7 g of the nanocrystalline ZSM-5 seed synthesized in Preparation Example 1 was added thereto and then stirred for 20 minutes to provide a solution 2. Subsequently, solution 1 and solution 2 were mixed with each other, stirred, put into a teflon vessel, hydrothermally synthesized at 170° C. for 24 hours and then cooled to room temperature to obtain a synthesized stock solution. Subsequently, the synthesized stock solution was dried at 120° C. for 12 hours, and then the X-ray diffraction (XRD) analysis and scanning electron microscope (SEM) analysis of the dried synthesized stock solution were conducted. The results thereof are shown in Table 1, FIG. 2 and FIGS. 5A and 5B.

Examples 1 to 4

Synthesis of ZSM-5 Using Nanocrystalline ZSM-5 Seed of Preparation Example 2

25.8 g of water glass serving as a silica source was mixed with 33.2 g of distilled water, and was then stirred for 30 minutes to provide solution 1. Further, 3.1 g of aluminum sulfate, 4.0 g (Example 1), 3.0 g (Example 2), 2.0 g (Example 3) or 1.1 g (Example 4) of sulfuric acid, and 33.2 g of distilled water were mixed and then stirred for 20 minutes, and then 0.7 g of the nanocrystalline ZSM-5 seed synthesized in Preparation Example 2 was added thereto and then stirred for 20 minutes to provide solution 2.

Figure 6A:
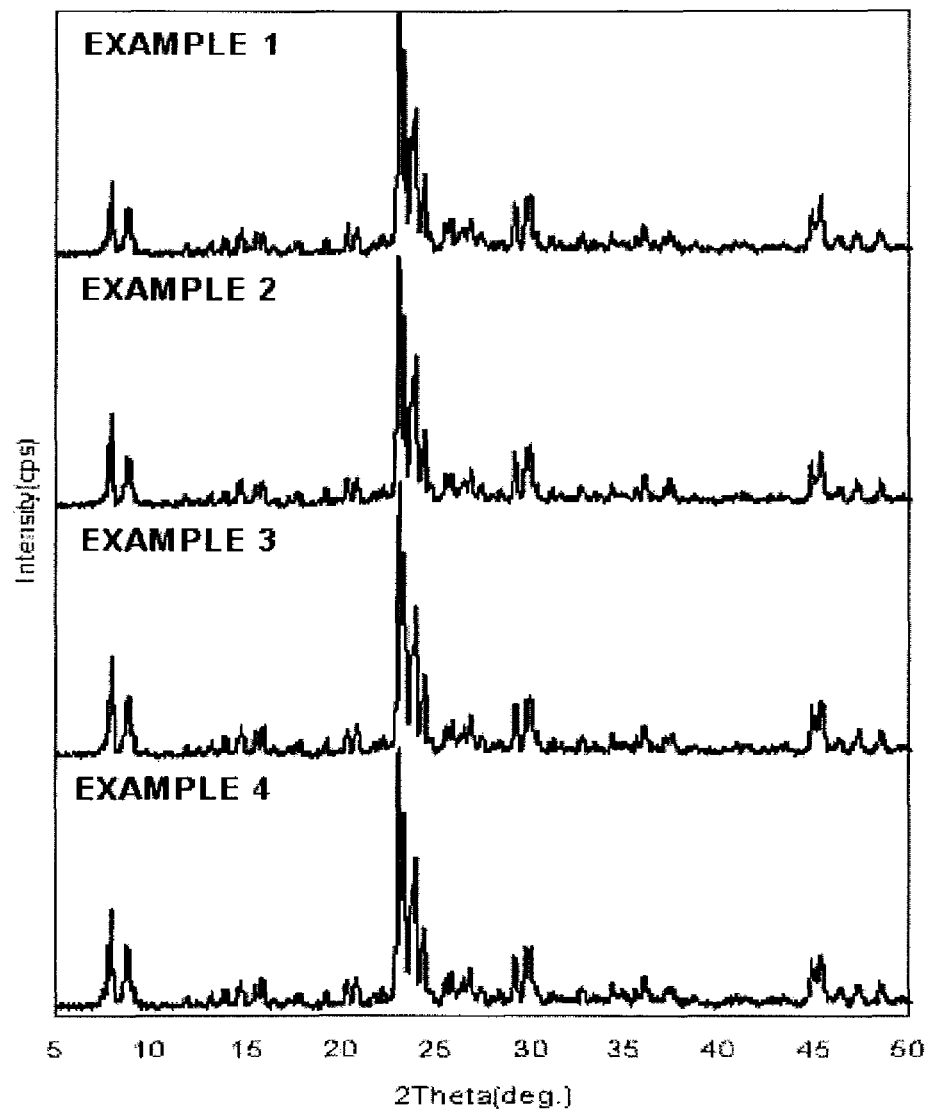
FIGS. 6A and 6B show a graph and a photograph of X-ray diffraction (XRD) analysis and scanning electron microscope (SEM) analysis of ZSM-5 seeds synthesized in Examples 1 to 4, respectively.
Figure 6B:
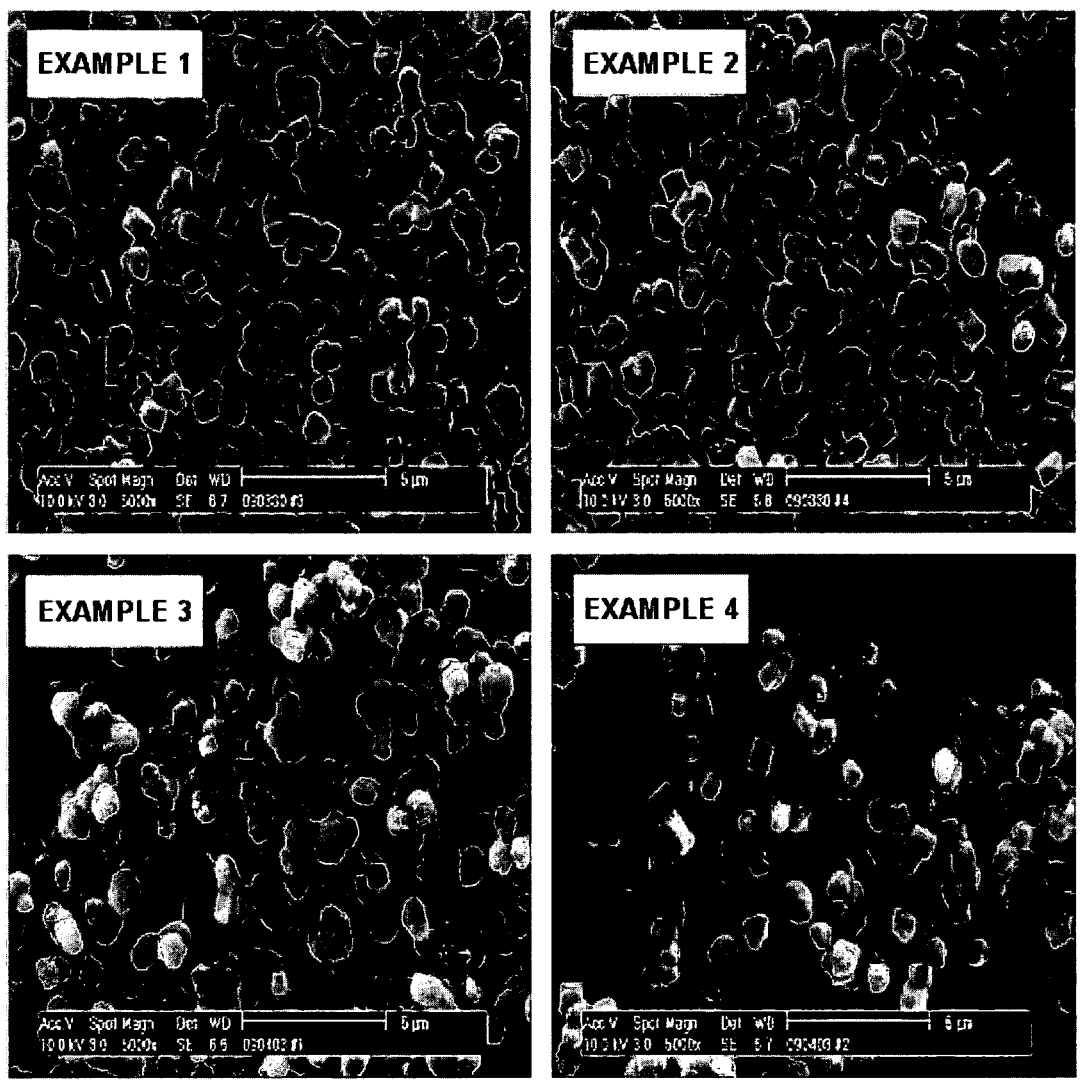

Subsequently, solution 1 and solution 2 were mixed with each other, stirred, put into a teflon vessel, hydrothermally synthesized at 170° C. for 24 hours and then cooled at room temperature to obtain a synthesized stock solution. Subsequently, the synthesized stock solution was dried at 120° C. for 12 hours, and then the X-ray diffraction (XRD) analysis and scanning electron microscope (SEM) analysis of the dried synthesized stock solution were conducted. The results thereof are shown in Table 1, FIG. 2 and FIGS. 6A and 6B.

Examples 5 and 6

Synthesis of ZSM-5 Depending on the Amount of Added Nanocrystalline ZSM-5 Seed 25.6 g of water glass serving as the silica source was mixed with 33.9 g of distilled water, and was then stirred for 30 minutes to provide solution 1. Further, 3.2 g (Example 5) or 3.1 g (Example 6) of aluminum salt, 1.9 g of sulfuric acid, and 33.9 g of distilled water were mixed and then stirred for 20 minutes, and then 1.4 g (Example 5) or 2.9 g (Example 6) of the nanocrystalline ZSM-5 seed synthesized in the Preparation Examples was added thereto and then stirred for 20 minutes to provide solution 2.

Figure 7A:
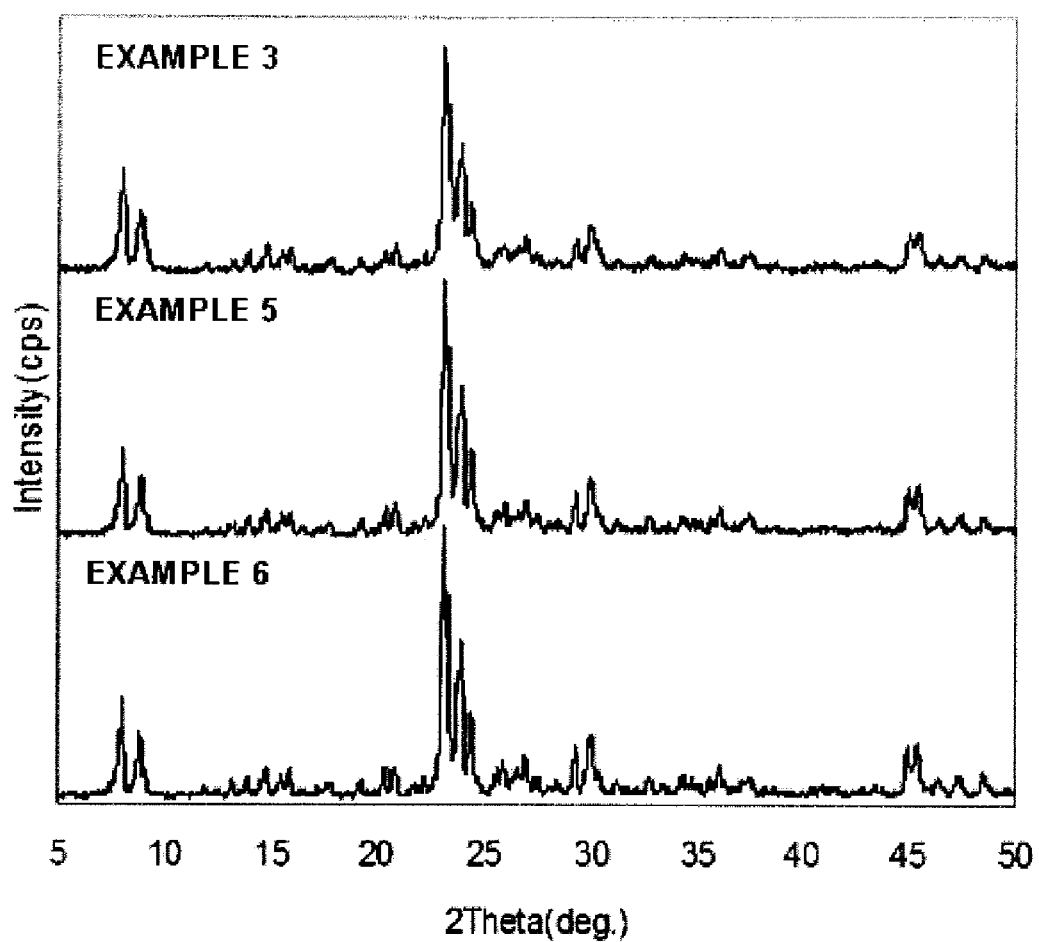
FIGS. 7A and 7B show a graph and a photograph of X-ray diffraction (XRD) analysis and scanning electron microscope (SEM) analysis of ZSM-5 seeds synthesized in Examples 3, 5 and 6, respectively.
Figure 7B:
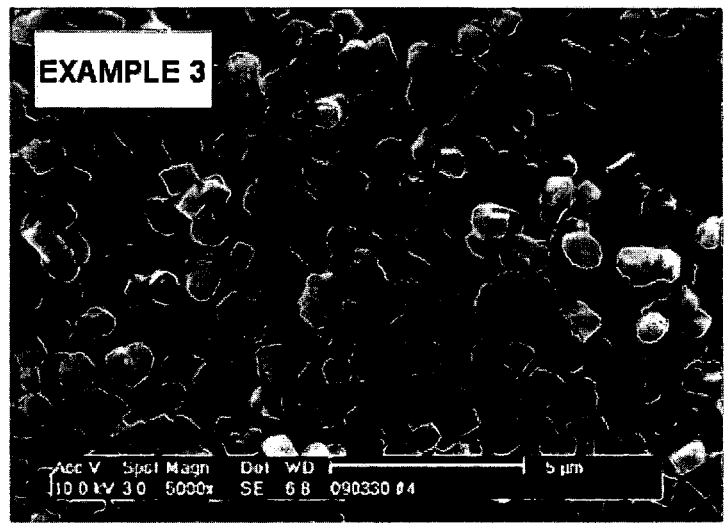
Figure 7B:
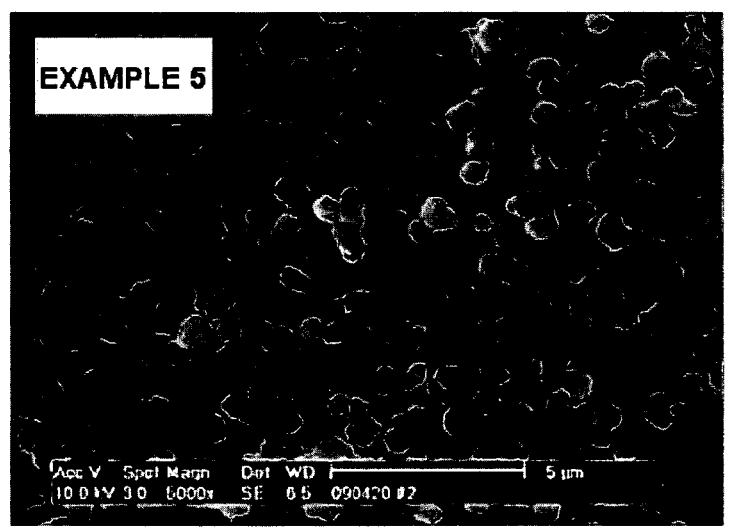
Figure 7B:
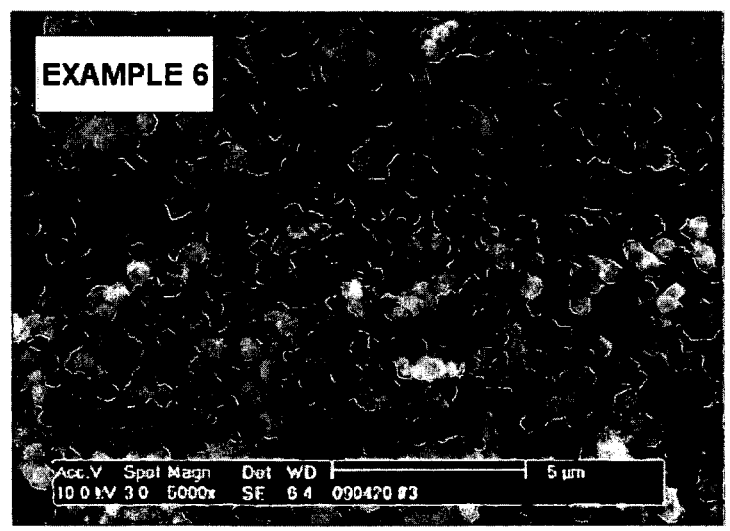

Subsequently, solution 1 and solution 2 were mixed with each other, stirred, put into a teflon vessel, hydrothermally synthesized at 170° C. for 24 hours and then cooled to room temperature to obtain a synthesized stock solution. Subsequently, the synthesized stock solution was dried at 120° C. for 12 hours, and then X-ray diffraction (XRD) analysis and scanning electron microscope (SEM) analysis of the dried synthesized stock solution were conducted. The results thereof are shown in Table 1, FIG. 2 and FIGS. 7A and 7B.

TABLE 2

| | Amount of raw material used (wt %) | | | | | Size of ZSM-5 seed (nm) | Phase after crystallization (crystallinity %) | average crystal size (μm) |
|---|---|---|---|---|---|---|---|---|
| | water glass | aluminum salt | sulfuric acid | distilled water | ZSM-5 seed | | | |
| Exp. 1 | 25.8 | 3.1 | 4.0 | 66.4 | 0.7 | 70~150 | ZSM-5 (103%) | 0.7~1.6 |
| Exp. 2 | 25.9 | 3.1 | 3.0 | 67.3 | 0.7 | 70~150 | ZSM-5 (101%) | 0.8~1.4 |
| Exp. 3 | 26.0 | 3.1 | 2.0 | 68.2 | 0.7 | 70~150 | ZSM-5 (104%) | 0.7~1.4 |
| Exp. 4 | 26.0 | 3.1 | 1.1 | 69.1 | 0.7 | 70~150 | ZSM-5 (100%) | 0.7~1.2 |
| Exp. 5 | 25.6 | 3.2 | 1.9 | 67.9 | 1.4 | 70~150 | ZSM-5 (105%) | 0.4~0.8 |
| Exp. 6 | 25.0 | 3.1 | 1.6 | 67.4 | 2.9 | 70~150 | ZSM-5 (109%) | 0.2~0.5 |
| Comp. Exp. 1 | 26.1 | 3.1 | 4.0 | 66.7 | — | — | ZSM-5 (107%) | 1.7~3.7 |
| Comp. Exp. 2 | 26.2 | 3.1 | 3.2 | 67.5 | — | — | mordenite | — |
| Comp. Exp. 3 | 26.2 | 3.2 | 2.2 | 68.4 | — | — | mordenite | — |
| Comp. Exp. 4 | 25.8 | 3.1 | 4.0 | 66.4 | 0.7 | 20~60 | ZSM-5 (89%) | 0.4~3.0 |
| Comp. Exp. 5 | 25.9 | 3.1 | 3.0 | 67.3 | 0.7 | 20~60 | ZSM-5 (89%) | 0.7~2.5 |
| Comp. Exp. 6 | 26.0 | 3.1 | 2.0 | 68.2 | 0.7 | 20~60 | ZSM-5 + mordenite (76%) | 0.4~2.0 |
| Comp. Exp. 7 | 26.0 | 3.1 | 1.1 | 69.1 | 0.7 | 20~60 | ZSM-5 + mordenite (33%) | 1.7~5.2 |

As shown in Table 2, it can be seen that the stability of the obtained ZSM-5 was improved and the size thereof was uniform because nanocrystalline ZSM-5 seed was used to synthesize ZSM-5. According to the effect attributable to the addition of nanocrystalline ZSM-5 seed, when nanocrystalline ZSM-5 seed having a particle size of 20~60 nm was used, ZSM-5 was obtained over a somewhat wide range, but the obtained ZSM-5 had low crystallinity and a wide particle size distribution.

However, when nanocrystalline ZSM-5 seed having a particle size of 70~150 nm was used, ZSM-5 having high crystallinity could be synthesized in wider range compared to when nanocrystalline ZSM-5 seed having a particle size of 20~60 nm was used, and high-quality ZSM-5 having fine and uniform crystals could be obtained. Further, as seen from the results of Examples 3, 5 and 6, finer ZSM-5 could be obtained depending on the increase in the amount of the added nanocrystalline ZSM-5 seed although the compositions of the reaction mixtures are the same.

The invention claimed is:

1. A method of preparing ZSM-5, comprising:
   providing a nanocrystalline ZSM-5 seed having a size of about 70 about 150 nm from organic structure-inducing material, a silica source and an alumina source,
   adding the nanocrystalline ZSM-5 seed to a stock solution including water glass as a silica source, an alumina source, a neutralizer and water to form a reaction mixture, wherein the solution has a composition represented by $[Na_2O]_X[Al_2O_3]_Y[SiO_2]_{100}[H_2O]_Z$ in which X is about 10 to about 26 (mole), Y is about 0.2 to about 5 (mole), and Z is about 2500 to about 4000 (mole); and
   maintaining the reaction mixture at about 150 to about 200° C. to crystallize the reaction mixture.

2. The method of preparing ZSM-5 according to claim 1, wherein the nanocrystalline ZSM-5 seed is included in an amount of about 0.1 to about 6 wt % based on the reaction mixture.

3. The method of preparing ZSM-5 according to claim 1, wherein the alumina source is one or more selected from sodium aluminate, aluminum nitrate, aluminum chloride, aluminum acetate, aluminum sulfate, aluminum isopropoxide, and aluminum acetylacetonate.

4. The method of preparing ZSM-5 according to claim 1, wherein the neutralizer is any one selected from hydrochloric acid, nitric acid, phosphoric acid, sulfuric acid, and aluminum sulfate.

5. The method of preparing ZSM-5 according to claim 1, wherein the crystallizing of the reaction mixture is performed for 12~72 hours.

* * * * *